CIRCUIT PROTECTING, GAS-TUBE, DISCHARGE INTERRUPTER

Filed Jan. 15, 1969

INVENTORS,
SOL SCHNEIDER & GEORGE W. TAYLOR
BY: Charles J. Sunderson, AGENT
Harry M. Saragovitz, Edward J. Kelly & Herbert Berl ATTORNEYS.

United States Patent Office 3,539,871
Patented Nov. 10, 1970

3,539,871

CIRCUIT PROTECTING, GAS-TUBE, DISCHARGE INTERRUPTER

Sol Schneider, Little Silver, and George W. Taylor, Brielle, N.J., assignors to the United States of America as represented by the Secretary of the Army Filed Jan. 15, 1969, Ser. No. 791,460
Int. Cl. H02h 7/20
U.S. Cl. 317—51 3 Claims

ABSTRACT OF THE DISCLOSURE

This disclosure relates to energy control and particularly to energy control in the form of isolation and protection for multiple, amplifier circuits operating from a common power source. More particularly, this disclosure is of the use of gas tubes as switches for isolating and protecting individual pulse-amplifier circuits or units of a multiple-unit system having a common power supply. This disclosure teaches the connection of a gas tube controlled by a magnetic field to each of the circuits to switch it off when the circuit faults or short circuits and to switch the circuit back on when the fault clears itself. This avoids draining the main capacitor bank through the short-circuit, which could damage the individual circuit and interfere with the operation of other circuits using the same, common, power supply.

The invention described herein may be manufactured, used, and licensed by or for the Government for governmental purposes without the payment to us of any royalty thereon.

BACKGROUND OF THE INVENTION

This circuit isolator was invented to meet the problems of power supplies for super power systems with pulse amplifiers for microwave pulse transmission. These systems, as the name implies, involve units of comparatively large size that handle voltages and currents, during a pulse transmission, that are considerably in excess of those encountered in conventional transmitters. The problems in super power pulse transmission systems are predictable. The voltages and currents involved are of values that approach the limits of conventional electronic circuitry. The RF tubes, themslves, are operating under conditions that make faulting or failure of the tube an unavoidable possibility. Then, too, the power surges that accompany such faulting are of a magnitude that can completely destroy the RF tube or other elements in the circuit involved, particularly when the power supply includes a large capacitor bank for energy storage.

This circuit isolator is particularly needed in systems where a plurality of pulse transmitters are required and are supplied by a single power supply. Such a situation occurs with a phase-array radar which has an extremely large antenna with many radiating elements, each powered by a separate pulse transmitter. The transmitters may all be fired together or may be fired in any sequence or phase necessary to have the desired effect on the transmitted beam. The problem is to provide protection for the individual pulse transmitters against short circuits and to minimize the damage attended on a fault in any one of the separate transmitters and, in any case, to keep the other transmitters operating with as little disturbance as possible during a fault of one of the units.

One solution would be to provide a separate power supply for each of the pulse transmitters. This would solve the problem of isolation but would be prohibitively expensive because of the cost and size of the separate power supplies. This would also be inefficient and would not reduce the possibility of damage to any one of the units. It is more desirable and more efficient to have a single, common, power supply serving all of the pulse transmitter units. This power supply would include a main energy source device in the form of a capacitor bank of sufficient capacity to supply the instantaneous power requirement of the entire system. Additional energy storage banks are also connected to each, individual pulse transmitted to provide the instantaneous energy needed during pulse transmissions at the actual location of the pulse transmitter to prevent jitter and electronic beam path instability due to the length of the lines between the main energy storage bank and the individual pulse transmitters.

When the systems are operating from a common power supply, each of the pulse transmitters is connected to the common power supply through an isolator. Isolators are necessary for each individual circuit to stop the discharge of the main capacitor bank until the secondary capacitor bank is discharged and the fault is cleared.

The isolator can take various forms, the most common form having passive components which may be merely a high voltage fuse with a backup circuit breaker. In the event of a fault the fuse would blow and the circuit breaker would open. The discharge current in the fuse can be quenched by sand or other medium in a well known manner. The circuit breaker either opens at the same time or it can be opened manually to facilitate the replacement of the fuse.

The passive-component isolator has the serious disadvantage of inactivating the circuit until the fuse is replaced and is tolerable only if faulting rarely occurs or if the sytem can operate effectively without some of the pulse transmitters. There is also a question as to whether the fuse could blow quickly enough to avoid a surge of current that might be enough to destroy the pulse transmitter or to effect the stability of the common power supply.

Various types of switches suggest themselves but most of them are not usable here because of the extremely high changes of voltage with respect to time that would result from the transients that occur when the load faults. For example, change in voltage with respect to time in the order of 300,000 volts per microsecond could appear across such an interrupter in existing pulse transmitters.

A vacuum tube type of switch connected in series with each of the pulse transmitters would be one way of interrupting the flow of current from the main capacitor bank and isolating the individual transmitters. In the event of a fault the vacuum tube could be switched off, thereby interrupting energy flow and providing protection for the pulse transmitter. After the fault clears, the vacuum tube could be automatically switched on again. However, such a vacuum tube would have to be specially designed to accommodate the extreme conditions noted above.

Alternatively, a novel circuit may be provided to minimize the voltage conditions and permit certain available vacuum tubes to be used as switches. Such a circuit is described in our co-pending application for a Vacuum Tube Isolator, Circuit Protector, and Voltage Regulator, Ser. No. 791,459, filed Jan. 15, 1969, now Pat. No. 3,939,-870.

Another manner of switching the current off during the short circuit of a pulse transmitter is by means of a gas tube provided that adequate and effective means can be provided for controlling the gaseous discharge of the tube.

It is therefore an object of this invention to provide an interrupter switch for an RF pulse transmitter using a gas tube.

It is a further object of this invention to provide a gas-tube, current-interrupter switch that can isolate a circuit from the main power supply in the event of a fault in that circuit to minimize the damage to the circuit during such a fault.

SUMMARY OF THE INVENTION

The isolation of a pulse transmitter from a common power supply and the control of current to the RF amplifier tube of the pulse transmitter is achieved by connecting a high-current, gas tube between the primary, energy-storage, capacitor bank of the common power supply and the RF amplifier tube through the resistive element that is normally connected between the secondary capacitor bank and the RF amplifier tube of the pulse transmitter. The inductive coil, that is normally connected between the secondary capacitor bank and the RF tube, is positioned adjacent to the gas tube to provide a magnetic field that interrupts the flow of current through the gas tube when the RF tube faults, and a sensing and control circuit across the RF tube actuates a second inductive coil that is also positioned adjacent to the gas tube and also provides a magnetic field that keeps the gas tube in a state of interruption until the fault clears itself. An energy diverter is connected across the RF tube and a series-limiting resistor.

DETAILED DESCRIPTION OF THE PREFERRED EMBODIMENTS

Figure 1:
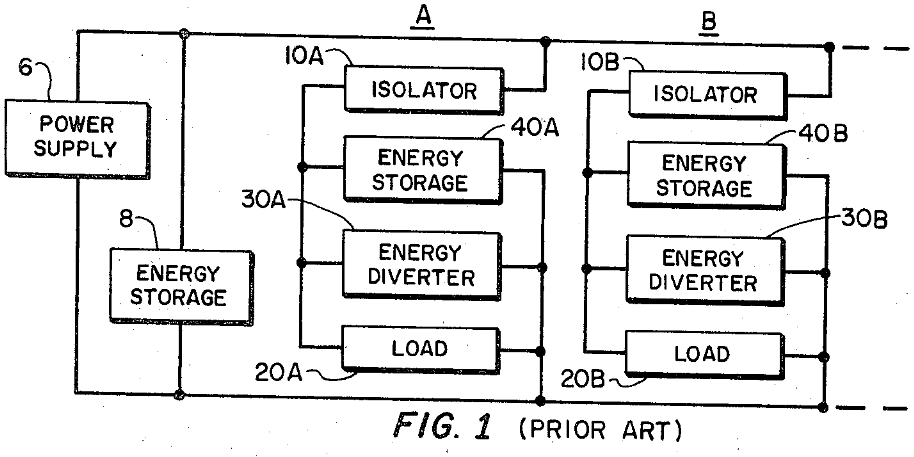
FIG. 1 (PRIOR ART)
FIG. 1 shows a block diagram of a conventional system for connecting multiple, isolated circuits to a common power supply.

Referring now to FIG. 1, a common power supply 6 is coupled to an energy-storage device 8 which supplies several pulse amplifier circuits such as A and B. In FIG. 1 each of the circuits has an isolator 10A, 10B, etc. separating the output loads 20A, 20B, etc. of the individual circuits from the common power supply. Each circuit normally has a secondary energy-storage device 40A, 40B, etc. and an energy diverter 30A, 30B, etc.

Figure 2:
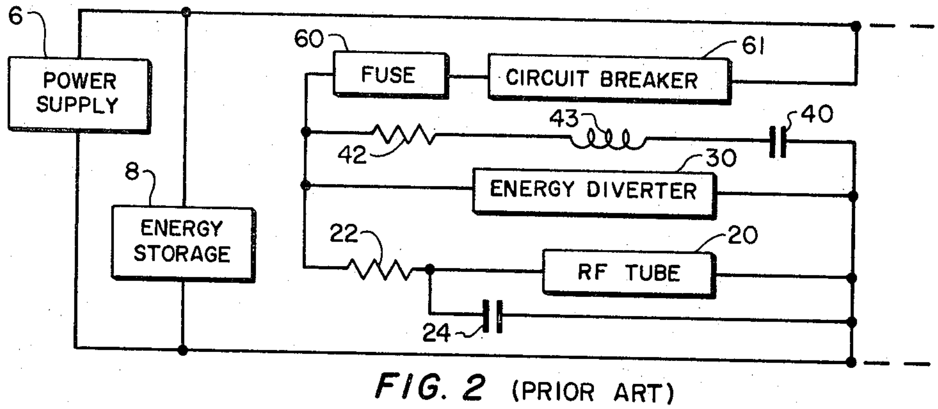
FIG. 2 (PRIOR ART)
FIG. 2 shows a single unit of such a system with a fuse type isolator circuit.

FIG. 2 shows the elements of FIG. 1 in more detail and similar elements are similarly numbered. The common power supply 6 and the energy-storage device 8 supply the load which is an RF tube 20. The secondary energy-storage device is a capacitor bank 40. The RF tube has a tertiary capacitive energy-storage device 24 and is connected across an energy diverter 30 through a current limiting resistor 22. The secondary capacitor bank 40 supplies current to the load through the resistor 42 and the inductor 43 which are needed to reduce and control the flow of current during a fault discharge. Each of the pulse amplifier circuits is isolated and protected by a fuse 60 and a circuit breaker 61.

In operation, if faulting of the RF tube 20 occurs, the energy diverter circuitry senses changes in voltage or current due to the fault, and fires itself to provide a current bypass for the faulting RF tube. This burns out the fuse and trips the circuit breaker to disconnect the common power supply from the pulse transmitter circuit. The inductance 43 delays the rise of fault current, and the resistor 42 limits the peak current and absorbs the energy drawn by the energy diverter 30. The resistor 22 limits the current through the RF tube itself during a fault. The fuse must be replaced, and the circuit breaker reset after the energy diverter discharges the capacitor 40 and the faulting of the RF tube clears itself.

Figure 3:
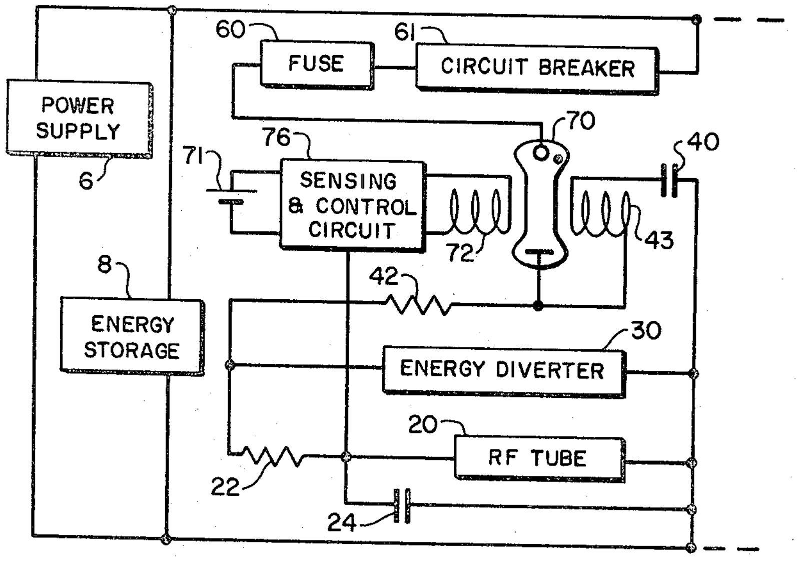
FIG. 3 shows a single unit of such a system with a gas tube isolator.

FIG. 3 shows this invention applied to a circuit similar to that of FIGS. 1 and 2, and similar elements are again, similarly numbered. The common power supply 6 and the main, energy-storage, capacitor bank 8 supply current for the RF tube. 20. Additional power is stored in and available from the secondary and tertiary capacitor banks 40 and 24 as needed. The resistors 22 and 42 have the same function as before, as does the inductance 43. However, in this device, the inductive coil 43 is positioned adjacent to the gas tube 70 so that its magnetic field can control the discharge current within the gas tube. A fuse 60 and circuit breaker 61 may again be provided for each pulse transmitter circuit, but the main isolator or current interrupter is now the gas-tube switch 70 which is, effectively, connected between the common power supply 6 and the RF tube 20 of the pulse transmitter. A sensing and control circuit 76 controls the energy from the secondary power-supply, battery 71 to the coil 72. The coil 72 is also positioned adjacent to the gas tube 70 so that its magnetic field can supplement that of the coil 43 to control the discharge current within the gas tube.

A gas tube has the capability of handling large currents without permanent damage. It also has a very low resistivity. However, the normal gas tube, operating in an arc mode, will continue to conduct unless the potential across it is reduced below the maintenance potential. Therefore, it would not, normally, be usable in this type of application. However, experiments have shown the feasibility of interrupting current in a high-current gas discharge by using a transverse magnetic field applied to the positive column of the discharge.

A gaseous discharge tube of this type, used in the circuit shown in FIG. 3, serves a double function of current supply and current interrupter. Between pulses, the gas tube functions as a charging diode to supply charging current to the secondary and tertiary capacitor banks 40 and 24. During a pulse, the gas tube supplies all available current from the main, energy-storage, capacitor bank to the RF tube. However, during a fault, a transverse magnetic field is generated in the inductor 43 by the discharge current of the capacitor 40 which is sufficient to quench the discharge in the gas tube 70 and prevents recharge of capacitor 40. By using an auxiliary field coil 72 operating from a low-voltage high-current power supply 71, the gas tube 70 can be kept turned off until the load circuit is ready for reactivation.

The operation of a system such as a phased-array radar is fairly well known. Such a system has a plurality of pulse transmitters including RF tubes such as 20 that are fired in a well known manner in any desired sequence or phase. Each of the RF tubes draws current from the main capacitor bank of a common power supply with additional secondary or tertiary capacitor banks meeting the instantaneous demands for additional current that is necessary when the inductive effects of too-long power lines delays the flow of current to the individual pulse transmitters.

In the operation of this particular isolator and regulator circuit, any faulting of the RF tube will appear as a short circuit with a sudden current surge, or voltage drop, which is sensed, as in the forementioned circuit operation, by the energy diverter, which fires to bypass the current away from the RF tube. However, in this circuit, the current surge through the RF tube and the energy diverter passes through the inductor 43 that limits the rise of the surge of current and, here, supplies a magnetic field that interrupts the discharge through the gas tube, thereby cutting off the power supplied to its pulse transmitter. The current surge or change in voltage across the RF tube is also detected by the sensing and control circuit 76 which applies power from the battery 71 to the coil 72 which is also adjacent to the gas tube, and which further interrupts the discharge through the gas tube and maintains the condition of interruption. When the energy diverter completes the discharge of capacitor bank 40 and the RF tube fault clears itself, the voltage sensing and control circuit 76 disconnects the power from the battery 71 to the coil 72 to permit the resumption of the gas-tube discharge.

In this circuit, the ratio of the capacity of the secondary capacitor bank 40, the inductance 43 and resistance 42 which form the energy diverting loop through the energy diverter 30 is designed to be slightly over-damped, rather than under-damped so that no voltage reversals appear across the gas-tube switch.

This circuit would use a gas tube of the type described in a paper entitled "Magnetic Field Control of a Gas Discharge Switch," by David V. Turnquist, published in the Proceedings of the Ninth Modulator Symposium at Fort Monmouth, N.J., May 1966. The paper discussed the magnetic field strength required for interrupting various gas discharge currents and other factors for the effective use of this principle. The parameters, for winding a coil to produce a sufficient magnetic field with the available current, can be found in any standard text. The choice of these and other parameters is a function of the power needed to energize the pulse transmitters. All components must be of adequate size and suitable values to handle the voltages and currents involved.

Only one of the pulse transmitters has been shown in FIGS. 2 and 3, for simplicity. It is obvious, however, that any number of additional units, like the one shown in FIG. 1, are intended to be added as needed.

Other current controlling inductors and resistors may be added to improve the functioning of the circuit where excessive currents may occur. This will vary with individual circuit parameters and operating conditions and such devices can be added as needed.

While the need for such isolators is clearly seen in these extremely high voltages and currents of super power amplifiers and transmitters where the faulting of a tube and short circuiting of a capacitor bank represents enormous and dangerous amounts of electrical power, this system is also applicable to smaller devices where the replacing of a fuse in inconvenient or the sudden change of the power supply voltage is undesirable.

Having described my invention, what is claimed is:

1. In a combination with a primary power supply and a pulse amplifier circuit comprising an RF tube, a capacitor bank, a first inductor, a first resistor and a second resistor connected in series, a protective circuit for connecting said pulse amplifier circuit to said primary power supply comprising a gaseous discharge tube; means for connecting said gaseous discharge tube between one terminal of said power supply and the junction between said first inductor and said first resistor; means for positioning said first inductor with its magnetic field applied in a transverse direction to the positive column of the discharge of said gaseous discharge tubes; a secondary power supply; a second inductor positioned with its magnetic field applied in a transverse direction to the positive column of the discharge of said gaseous discharge tube; a sensing and control circuit connected between said secondary source of power and said second inductor; means for connecting said sensing and control circuit to said RF tube to be actuated when said RF tube is shorted; and means for connecting the other terminal of said power supply to the junction between said RF tube and said capacitor bank.

2. In combination with a primary power supply as in claim 1, a plurality of said pulse amplifier circuits, each having one of said gaseous discharge tube protective circuits as in claim 1.

3. In a circuit as in claim 1 an energy diverter, and means for connecting said energy diverter in series with said RF tube and said second resistor.

References Cited

UNITED STATES PATENTS

| | | | |
|---|---|---|---|
| 2,438,962 | 4/1948 | Burlingame et al. | 328—9 |
| 2,815,445 | 12/1957 | Young et al. | 317—51 X |
| 2,845,529 | 7/1958 | Weldon | 328—9 |
| 3,277,342 | 10/1966 | Ross | 317—51 X |

JAMES D. TRAMMELL, Primary Examiner

U.S. Cl. X.R.

307—108; 328—9